(12) United States Patent
Fujita (10) Patent No.: US 11,300,010 B2
(45) Date of Patent: Apr. 12, 2022

(54) COOLING EQUIPMENT, COMBINED CYCLE PLANT COMPRISING SAME, AND COOLING METHOD

(71) Applicant: MITSUBISHI HITACHI POWER SYSTEMS, LTD., Kanagawa (JP)

(72) Inventor: Kazunori Fujita, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 547 days.

(21) Appl. No.: 15/504,531

(22) PCT Filed: Sep. 8, 2015

(86) PCT No.: PCT/JP2015/075493
§ 371 (c)(1),
(2) Date: Feb. 16, 2017

(87) PCT Pub. No.: WO2016/043094
PCT Pub. Date: Mar. 24, 2016

(65) Prior Publication Data
US 2018/0223696 A1 Aug. 9, 2018

(30) Foreign Application Priority Data

Sep. 18, 2014 (JP) .............................. JP2014-189910

(51) Int. Cl.
*F02C 7/224* (2006.01)
*F01K 9/00* (2006.01)
(Continued)

(52) U.S. Cl.
CPC .............. *F01K 9/003* (2013.01); *F01D 25/12* (2013.01); *F01K 23/10* (2013.01); *F02C 7/224* (2013.01); *Y02E 20/16* (2013.01)

(58) Field of Classification Search
CPC .......... F01K 23/10; F01K 9/003; F01K 23/02; F02C 7/224; F02C 7/236; F02C 7/32;
(Continued)

(56) References Cited

U.S. PATENT DOCUMENTS 3,726,085 A * 4/1973 Arenson ................. F01K 9/003
60/772
4,696,156 A * 9/1987 Burr ........................ F01D 25/18
60/39.08
(Continued)

FOREIGN PATENT DOCUMENTS

| EP | 2 133 515 | 12/2009 |
|---|---|---|
| JP | 63-186908 | 11/1988 |

(Continued)

OTHER PUBLICATIONS

International Search Report dated Dec. 8, 2015 in International Application No. PCT/JP2015/075493 (with English translation).
(Continued)

*Primary Examiner* — Todd E Manahan
*Assistant Examiner* — Thuyhang N Nguyen
(74) *Attorney, Agent, or Firm* — Wenderoth, Lind & Ponack, L.L.P.

(57) ABSTRACT

This cooling equipment comprises: a refrigerant supply line (81) supplying, to a condenser (6), a condenser refrigerant which cools steam (Sb) that has driven a steam turbine (5), to return the steam (Sb) to water (W); and a cooling part (80) which is disposed on the refrigerant supply line (81), and performs heat exchange between liquefied gas used as fuel for a gas turbine (2) and the condenser refrigerant to heat and vaporize the liquefied gas and to cool the condenser refrigerant at the same time.

3 Claims, 6 Drawing Sheets

(51) Int. Cl.
*F01K 23/10* (2006.01)
*F01D 25/12* (2006.01)

(58) Field of Classification Search
CPC ... F01D 25/12; Y02C 20/16; F05B 2220/301; F05B 2220/302; F05B 2260/20; F05B 2260/205
See application file for complete search history.

(56) References Cited

U.S. PATENT DOCUMENTS

| | | | | |
|---|---|---|---|---|
| 5,457,951 | A * | 10/1995 | Johnson | F01K 23/10 60/39.182 |
| 6,244,035 | B1 * | 6/2001 | Krill | F01K 23/10 60/39.182 |
| 6,269,626 | B1 * | 8/2001 | Kim | F01K 23/106 122/7 B |
| 6,598,408 | B1 * | 7/2003 | Nierenberg | F17C 9/04 62/50.2 |
| 6,626,635 | B1 * | 9/2003 | Prowse | F01D 11/18 415/1 |
| 6,968,696 | B2 * | 11/2005 | Little | F01D 5/08 60/772 |
| 7,293,600 | B2 * | 11/2007 | Nierenberg | F17C 5/06 165/41 |
| 8,607,580 | B2 * | 12/2013 | Faka | F17C 5/06 62/50.2 |
| 2009/0313999 | A1 * | 12/2009 | Hunter | F02C 7/232 60/772 |
| 2010/0307157 | A1 * | 12/2010 | Bilton | F02C 6/18 60/730 |
| 2012/0179597 | A1 | 7/2012 | Borkovec et al. | |
| 2014/0341256 | A1 * | 11/2014 | Azeem | G01K 3/08 374/165 |
| 2016/0032900 | A1 * | 2/2016 | Mishima | F03D 9/007 290/36 R |

FOREIGN PATENT DOCUMENTS

| | | |
|---|---|---|
| JP | 64-8304 | 1/1989 |
| JP | 1-219465 | 9/1989 |
| JP | 3-3902 | 1/1991 |
| JP | 7-119487 | 5/1995 |
| JP | 7-139370 | 5/1995 |
| JP | 8-506643 | 7/1996 |
| JP | 11-506181 | 6/1999 |
| JP | 11-200884 | 7/1999 |
| JP | 2001-323807 | 11/2001 |
| JP | 2005-98240 | 4/2005 |
| JP | 4554641 | 9/2010 |
| KR | 10-0370910 | 3/2003 |
| WO | 95/16105 | 6/1995 |
| WO | 96/38656 | 12/1996 |
| WO | 2008/047489 | 4/2008 |

OTHER PUBLICATIONS

Written Opinion of the International Searching Authority dated Dec. 8, 2015 in International Application No. PCT/JP2015/075493 (with English translation).

* cited by examiner

COOLING EQUIPMENT, COMBINED CYCLE PLANT COMPRISING SAME, AND COOLING METHOD

TECHNICAL FIELD

The present invention relates to cooling equipment, a combined cycle plant which is provided with the cooling equipment, and a cooling method.

Priority is claimed on Japanese Patent Application No. 2014-189910, filed on Sep. 18, 2014, the content of which is incorporated herein by reference.

BACKGROUND ART

In a combined cycle plant which is configured by combining a gas turbine and a steam turbine, steam is generated by using waste heat of high-temperature flue gas which is discharged from the gas turbine. In the combined cycle plant, the steam turbine is driven by the steam.

In such a combined cycle plant, in order to improve output, there is a case where a configuration of cooling intake air of the gas turbine and thereby increasing the intake air amount (the mass flow rate) of a compressor of the gas turbine is used. For example, in a liquefied natural gas combined cycle power plant disclosed in PTL 1, combustion air which is supplied to a compressor of a gas turbine is passed through an intake air cooler. In this way, the combustion air is subjected to heat exchange with methane hydrate slurry or water in a methane hydrate storage tank. For this reason, in the liquefied natural gas combined cycle power plant, the combustion air is cooled to a certain temperature, and thus the intake air amount of the compressor is increased. Therefore, in the liquefied natural gas combined cycle power plant, the intake air amount increases, whereby the output of the gas turbine is improved.

CITATION LIST

Patent Literature

[PTL 1] Japanese Unexamined Patent Application Publication No. 11-200884

SUMMARY OF INVENTION

Technical Problem

Incidentally, in a case of increasing the intake air amount by cooling the combustion air of the compressor of the gas turbine, as long as an attempt to maintain a combustion temperature at the same temperature is made, the amount of consumption of fuel which is used in a combustor also increases. As a result, improvement in thermal efficiency as a combined cycle plant is unlikely to be expected. For this reason, there is a desire to improve power generation efficiency in the combined cycle plant by improving the output of the steam turbine without increasing the fuel consumption of the gas turbine.

The present invention provides cooling equipment capable of improving the output of a steam turbine, a combined cycle plant which is provided with the cooling equipment, and a cooling method.

Solution to Problem

In order to solve the above problem, the present invention proposes the following means.

Cooling equipment according to a first aspect of the present invention includes: a refrigerant supply line for supplying a condenser refrigerant which cools steam that has driven a steam turbine, thereby returning the steam to water, to a condenser; and a cooling part which is provided on the refrigerant supply line and performs heat exchange between liquefied gas which is used as fuel for a gas turbine and the condenser refrigerant, thereby heating and vaporizing the liquefied gas and cooling the condenser refrigerant.

According to such a configuration, the condenser refrigerant is cooled by using the liquefied gas in the cooling part and the cooled condenser refrigerant is sent to the condenser through the refrigerant supply line. In this way, it is possible to cool the steam used for the driving of the steam turbine. Therefore, the degree of vacuum of the condenser is improved by cooling the steam by using the condenser refrigerant cooled by the liquefied gas, and thus it is possible to increase the amount of work of the steam turbine. In this way, the cold energy of the liquefied gas is recovered and can be effectively used as energy for cooling the steam which has driven the steam turbine.

In cooling equipment according to a second aspect of the present invention, in the first aspect, the cooling part may include a liquefied gas heat exchange part which cools a first intermediate refrigerant by heat exchange with the liquefied gas, a first intermediate refrigerant circulation line which is connected to the liquefied gas heat exchange part, and through which the cooled first intermediate refrigerant circulates, and a first intermediate cooling part which is provided on the first intermediate refrigerant circulation line and cools the condenser refrigerant by using the first intermediate refrigerant which circulates.

According to such a configuration, after the first intermediate refrigerant is cooled in the liquefied gas heat exchange part by using the liquefied gas, the condenser refrigerant can be cooled in the first intermediate cooling part by using the cooled first intermediate refrigerant. In this way, it is possible to indirectly cool the condenser refrigerant by using the liquefied gas. For this reason, it is possible to reduce a temperature difference between the liquefied gas and the first intermediate refrigerant and a temperature difference between the first intermediate refrigerant and the condenser refrigerant. Therefore, it is possible to provide means for cooling the condenser refrigerant while preventing the condenser refrigerant from freezing. In this way, the cold energy of the liquefied gas can be recovered and can be effectively used as energy for cooling the steam which has driven the steam turbine.

In cooling equipment according to a third aspect of the present invention, in the second aspect, the first intermediate cooling part may include a first intermediate refrigerant heat exchange part which cools a second intermediate refrigerant by heat exchange with the cooled first intermediate refrigerant, a second intermediate refrigerant circulation line which is connected to the first intermediate refrigerant heat exchange part, and through which the cooled second intermediate refrigerant circulates, and a second intermediate cooling part which is provided on the second intermediate refrigerant circulation line and cools the condenser refrigerant by using the second intermediate refrigerant which circulates.

According to such a configuration, after the second intermediate refrigerant is cooled in the first intermediate refrigerant heat exchange part by using the first intermediate refrigerant cooled by the liquefied gas, the condenser refrigerant can be cooled in the second intermediate cooling part by the cooled second intermediate refrigerant. That is, indirect cooling can be performed through two stages of refrigerants until the condenser refrigerant is cooled by using the liquefied gas. In this manner, due to a configuration composed of a plurality of intermediate refrigerant cycles having different operating temperature zones, it is possible to further reduce a temperature difference between two fluids flowing through each heat exchange part. In this way, it is possible to reduce a thermal load per heat exchange part, and thus it is possible to use a heat exchange part having a compact configuration as each heat exchange part. Due to a configuration composed of a plurality of intermediate refrigerant cycles having different operating temperature zones, diversion to a plant cycle such as a cycle of shaft cooling water for a plant auxiliary machine (or cooling thereof), for example, is also possible. Therefore, it is possible to provide means for cooling the condenser refrigerant while preventing the condenser refrigerant from freezing. In this way, cold energy which is generated when vaporizing the liquefied gas can be recovered and can be effectively used as energy for cooling the steam which has driven the steam turbine.

In cooling equipment according to a fourth aspect of the present invention, in any one of the first to third aspects, seawater may be used as the condenser refrigerant and the seawater may be discharged to the sea after the seawater has cooled the steam.

A combined cycle plant according to a fifth aspect of the present invention includes: the cooling equipment according to any one of the first to fourth aspects; the gas turbine; a heat recovery steam generator which generates steam by flue gas which is discharged from the gas turbine; the steam turbine which is driven by the steam generated in the heat recovery steam generator; and the condenser.

According to such a configuration, it is possible to improve the output of the steam turbine without increasing the fuel consumption of the gas turbine. As a result, it is possible to improve the thermal efficiency of the combined cycle plant as a whole.

A cooling method according to a sixth aspect of the present invention includes: a refrigerant supply step of supplying a condenser refrigerant which cools steam that has driven a steam turbine, thereby returning the steam to water, to a condenser; and a cooling step of performing, before the refrigerant supply step, heat exchange between liquefied gas which is used as fuel for a gas turbine and the condenser refrigerant, thereby heating and vaporizing the liquefied gas and cooling the condenser refrigerant.

According to such a configuration, it is possible to send the cooled condenser refrigerant to the condenser in the refrigerant supply step by using heat when vaporizing the liquefied gas in the cooling step. In this way, it is possible to cool the steam used for the driving of the steam turbine. Therefore, the degree of vacuum of the condenser is improved by cooling the steam by the condenser refrigerant cooled by the liquefied gas, and thus it is possible to increase the amount of work of the steam turbine. Instead of cooling the steam by directly supplying the liquefied gas to the condenser, after the condenser refrigerant is cooled with the liquefied gas, the cooled condenser refrigerant is supplied to the condenser so as to cool the steam. In this way, the cold energy of the liquefied gas is recovered and can be effectively used as energy for cooling the steam which has driven the steam turbine.

In a cooling method according to a seventh aspect of the present invention, in the sixth aspect, the cooling step may include a liquefied gas heat exchange step of cooling a first intermediate refrigerant by heat exchange with the liquefied gas, a first intermediate refrigerant circulation step of circulating the first intermediate refrigerant cooled in the liquefied gas heat exchange step, and a first intermediate cooling step of cooling the condenser refrigerant by using the first intermediate refrigerant which circulates, after the first intermediate refrigerant circulation step.

According to such a configuration, after the first intermediate refrigerant is cooled by using the liquefied gas in the liquefied gas heat exchange step, the condenser refrigerant can be cooled by using the cooled first intermediate refrigerant in the first intermediate cooling step. In this way, it is possible to indirectly cool the condenser refrigerant by using the liquefied gas. For this reason, it is possible to reduce a temperature difference between the liquefied gas and the first intermediate refrigerant and a temperature difference between the first intermediate refrigerant and the condenser refrigerant. Therefore, it is possible to provide means for cooling the condenser refrigerant while preventing the condenser refrigerant from freezing. In this way, the cold energy of the liquefied gas can be recovered and can be effectively used as energy for cooling the steam which has driven the steam turbine.

In a cooling method according to a eighth aspect of the present invention, in the seventh aspect, the first intermediate cooling step may include a first intermediate refrigerant heat exchange step of cooling a second intermediate refrigerant by heat exchange with the cooled first intermediate refrigerant, a second intermediate refrigerant circulation step of circulating the second intermediate refrigerant cooled in the first intermediate refrigerant heat exchange step, and a second intermediate cooling step of cooling the condenser refrigerant by using the second intermediate refrigerant which circulates, after the second intermediate refrigerant circulation step.

According to such a configuration, after the second intermediate refrigerant is cooled in the first intermediate refrigerant heat exchange step by using the first intermediate refrigerant cooled by the liquefied gas, the condenser refrigerant can be cooled in the second intermediate cooling step by the cooled second intermediate refrigerant. That is, indirect cooling can be performed through two stages of refrigerants until the condenser refrigerant is cooled by using the liquefied gas. In this manner, due to a configuration composed of a plurality of intermediate refrigerant cycles having different operating temperature zones, it is possible to further reduce a temperature difference between two fluids flowing through each heat exchange part. In this way, it is possible to reduce a thermal load per heat exchange part, and thus it is possible to use a heat exchange part having a compact configuration as each heat exchange part. Due to a configuration composed of a plurality of intermediate refrigerant cycles having different operating temperature zones, diversion to a plant cycle such as a cycle of shaft cooling water for a plant auxiliary machine (or cooling thereof), for example, is also possible. Therefore, it is possible to provide means for cooling the condenser refrigerant while preventing the condenser refrigerant from freezing. In this way, cold energy which is generated when vaporizing the liquefied gas can be recovered and can be effectively used as energy for cooling the steam which has driven the steam turbine.

Advantageous Effects of Invention

According to the present invention, by cooling the condenser refrigerant by using the liquefied gas, it is possible to improve the output of the steam turbine without increasing the fuel consumption of the gas turbine.

DESCRIPTION OF EMBODIMENTS

First Embodiment

Figure 1:
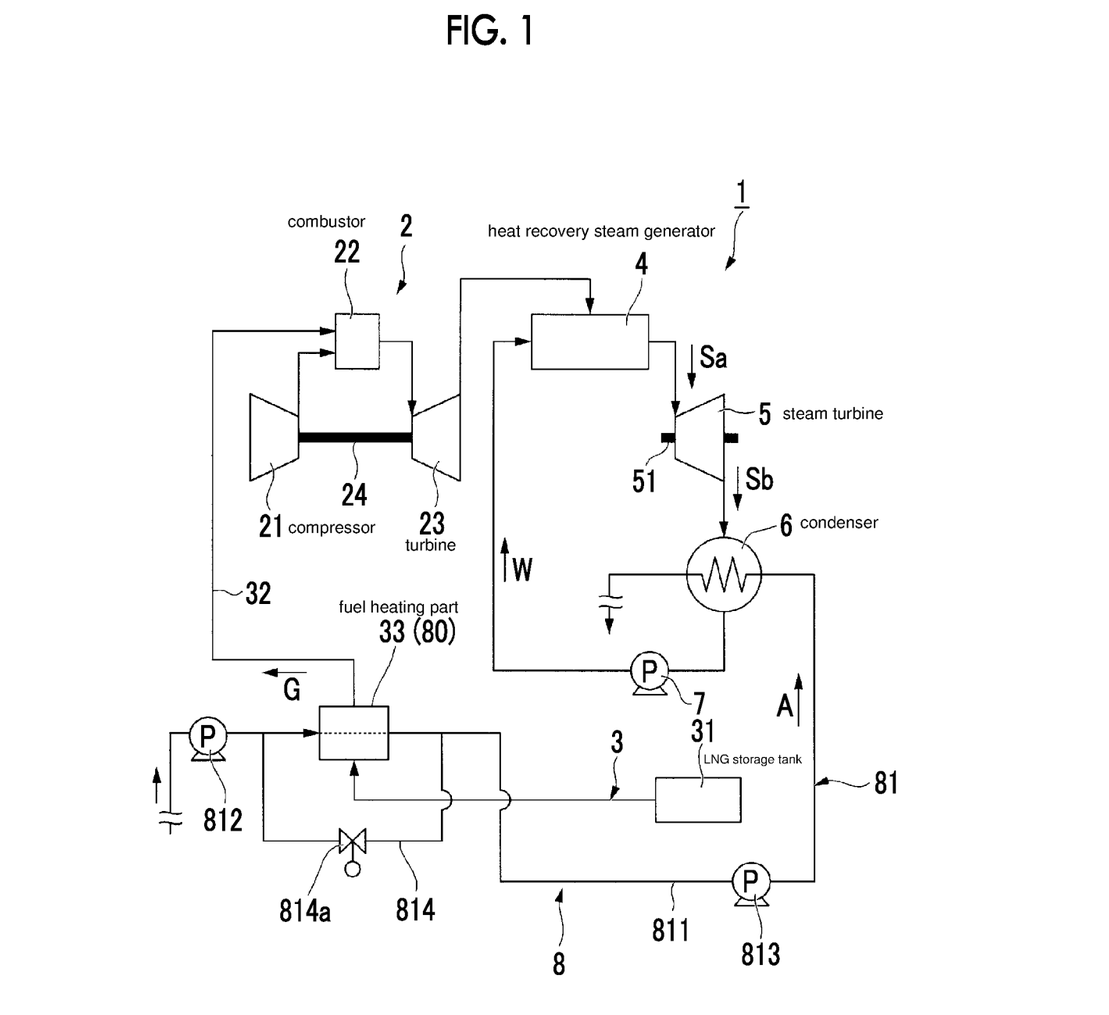
FIG. 1 is a system diagram showing a combined cycle plant in a first embodiment of the present invention.

Hereinafter, a first embodiment of the present invention will be described with reference to FIGS. 1 and 2.

A combined cycle plant 1 is provided with a gas turbine 2, a fuel supply part 3, a heat recovery steam generator 4, a steam turbine 5, a condenser 6, a feed-water pump 7, and cooling equipment 8. The gas turbine 2 is operated using liquefied gas as fuel. The fuel supply part 3 supplies fuel to the gas turbine 2. The heat recovery steam generator 4 generates steam Sa by using waste heat of flue gas which is discharged from the gas turbine 2. The steam turbine 5 is driven by the steam Sa generated in the heat recovery steam generator 4. The condenser 6 returns steam Sb which has driven the steam turbine 5 to water W. The feed-water pump 7 sends the water W returned in the condenser 6 to the heat recovery steam generator 4. The cooling equipment 8 supplies a condenser refrigerant for cooling the steam Sb to the condenser 6.

The gas turbine 2 is provided with a compressor 21 which compresses air, a plurality of combustors 22 which generate combustion gas by burning fuel in air compressed in the compressor 21, and a turbine 23 which is driven by high-temperature and high-pressure combustion gas. A turbine rotor of the turbine 23 and a compressor rotor of the compressor 21 rotate around the same axis. The turbine rotor of the turbine 23 and the compressor rotor of the compressor 21 are connected to each other, thereby forming a gas turbine rotor 24. For example, a generator rotor of a generator (not shown) is connected to the gas turbine rotor 24, and the gas turbine rotor 24 rotates, thereby driving the generator. The combustion gas exhausted from the turbine 23 is supplied to the heat recovery steam generator 4 as exhaust gas.

The fuel supply part 3 supplies fuel to the combustors 22. The fuel supply part 3 of this embodiment vaporizes liquefied natural gas (LNG) G having a low temperature of about −160° C. among liquefied gases and supplies the vaporized liquefied natural gas to the combustors 22. The fuel supply part 3 of this embodiment has a storage tank 31, a fuel supply line 32, and a fuel heating part 33. The storage tank 31 stores the liquefied natural gas G. The fuel supply line 32 supplies the liquefied natural gas G from the storage tank 31 to the combustors 22. The fuel heating part 33 is provided on the fuel supply line 32 so as to heat and vaporize the liquefied natural gas G.

The storage tank 31 stores the liquefied natural gas G having a temperature of about −160° in a liquefied state.

The fuel supply line 32 is a pipe which is connected from the storage tank 31 to the combustors 22.

The fuel heating part 33 is provided in the middle of the fuel supply line 32 and evaporates and vaporizes the liquefied natural gas G. The fuel heating part 33 of this embodiment is also used as a cooling part 80 in the cooling equipment 8 (described later).

The heat recovery steam generator 4 generates the steam Sa by heating the water W which has been sent thereto by the feed-water pump 7, by using the flue gas. The heat recovery steam generator 4 supplies the generated steam Sa to the steam turbine 5.

The steam turbine 5 rotates a steam turbine rotor 51 by performing expansion work by using the steam Sa supplied from the heat recovery steam generator 4. The steam turbine rotor 51 is configured of a separate shaft from the gas turbine rotor 24 and rotates independently. The steam turbine 5 discharges the steam Sa which has rotated the steam turbine rotor 51 to the condenser 6.

The steam turbine rotor 51 is not limited to a structure of the separate shaft as in this embodiment. The steam turbine rotor 51 may have a structure in which it is mutually connected to the gas turbine rotor 24 and rotates around the same axis.

The condenser 6 cools the steam Sb which is discharged from the steam turbine 5, thereby returning it to the water W. The condenser 6 performs heat exchange between a condenser refrigerant which is supplied from the cooling equipment 8 and the steam Sb, thereby cooling and condensing the steam Sb and thereby returning it to the water W.

The feed-water pump 7 pressure-feeds the water W which has been returned from the steam Sb in the condenser 6 to the heat recovery steam generator 4.

The cooling equipment 8 supplies the cooled condenser refrigerant to the condenser 6. The cooling equipment 8 is provided with a refrigerant supply line 81 which supplies the condenser refrigerant to the condenser 6, and the cooling part 80 which is provided on the refrigerant supply line 81 and cools the condenser refrigerant by using the liquefied natural gas G.

The refrigerant supply line 81 supplies the condenser refrigerant which cools the steam Sb which has driven the steam turbine 5 to the condenser 6. The refrigerant supply line 81 of this embodiment takes in seawater A as the condenser refrigerant from the sea and sends the seawater A to the condenser 6. The refrigerant supply line 81 cools the steam Sb supplied from the steam turbine 5 and then discharges the seawater A sent to the condenser 6 to the sea again.

The refrigerant supply line 81 of this embodiment has a refrigerant supply line main body 811, a water intake pump 812, a condenser refrigerant booster pump 813, and a supply bypass line 814. The refrigerant supply line main body 811 is a pipe. The water intake pump 812 pressure-feeds the taken-in seawater A toward the cooling part 80 on the further upstream side with respect to the cooling part 80. The condenser refrigerant booster pump 813 pressure-feeds the seawater A cooled by the cooling part 80 toward the condenser 6 on the further downstream side with respect to the cooling part 80. The supply bypass line 814 is connected to the refrigerant supply line main body 811 by bypassing the cooling part 80 so as not to pass through the cooling part 80. The supply bypass line 814 is provided with a supply bypass valve 814a which adjusts the flow rate of the seawater A which flows therethrough.

The cooling part 80 is provided in the middle of the refrigerant supply line main body 811. The cooling part 80 cools the seawater A by using the liquefied natural gas G which is used for an operation of the gas turbine 2. The cooling part 80 of this embodiment is the fuel heating part 33 which vaporizes the liquefied natural gas G. That is, the fuel heating part 33 of the first embodiment is disposed across the fuel supply line 32 and the refrigerant supply line 81. The cooling part 80 performs heat exchange between the liquefied natural gas G and the seawater A when vaporizing the liquefied natural gas G, thereby heating the liquefied natural gas G and at the same time, cooling the seawater A.

Next, an operation of the combined cycle plant 1 will be described.

According to the combined cycle plant 1 of the first embodiment, the liquefied natural gas G in the storage tank 31 of the fuel supply part 3 is sent to the fuel heating part 33 through the fuel supply line 32 and is vaporized therein. The vaporized liquefied natural gas G is supplied from the fuel heating part 33 to the combustors 22 through the fuel supply line 32. In each of the combustors 22, combustion gas is generated by the supplied liquefied natural gas G and compressed air generated in the compressor 21. The generated combustion gas is sent to the turbine 23 and drives the turbine 23. The turbine 23 is driven, whereby the gas turbine rotor 24 rotates and power generation is performed by a generator (not shown).

The combustion gas which has driven the turbine 23 is discharged from the turbine 23 as flue gas and sent to the heat recovery steam generator 4. In the heat recovery steam generator 4, the water W which is supplied from the condenser 6 is heated by the flue gas, whereby the steam Sa is generated. The generated steam Sa is sent to the steam turbine 5 and drives the steam turbine 5. The steam Sb which has driven the steam turbine 5 is sent to the condenser 6 and is cooled and condensed by the seawater A that is the condenser refrigerant, thereby being returned to the water W. The water W returned from the steam Sb which is condensed is sent to the heat recovery steam generator 4 again by the feed-water pump 7.

Next, a cooling method S100 of cooling the condenser refrigerant which is supplied to the condenser 6 will be described.

Figure 2:
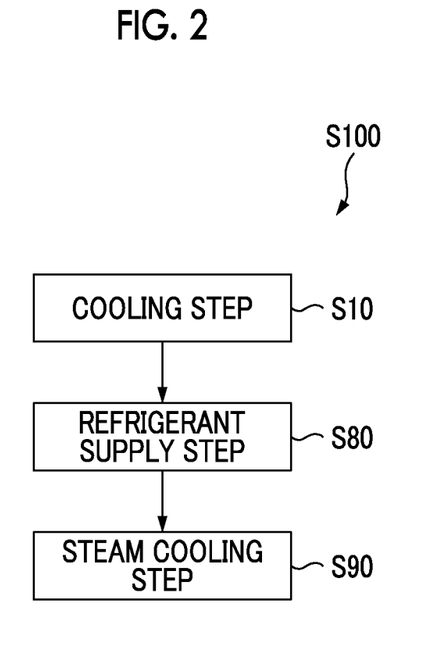
FIG. 2 is a flow diagram describing a cooling method in the first embodiment of the present invention.

In the cooling method S100 of the first embodiment, as shown in FIG. 2, the cooling method S100 includes a cooling step S10, a refrigerant supply step S80, and a steam cooling step S90. In the cooling step S10, the condenser refrigerant is cooled by using the liquefied natural gas G which is used for an operation of the gas turbine 2. In the refrigerant supply step S80, the condenser refrigerant which cools the steam Sb which has driven the steam turbine 5 is supplied to the condenser 6. In the steam cooling step S90, the steam Sb is cooled in the condenser 6 by using the cooled condenser refrigerant.

In the cooling step S10, the condenser refrigerant is cooled by using the low-temperature liquefied natural gas G beforehand. In the cooling step S10 of the first embodiment, the condenser refrigerant is cooled by performing heat exchange between the liquefied natural gas G and the condenser refrigerant by using the fuel heating part 33 that is the cooling part 80. Specifically, in the cooling step S10, the seawater A is taken in from the sea through the refrigerant supply line main body 811 by driving the water intake pump 812 and is supplied to the fuel heating part 33.

In the cooling step S10, the liquefied natural gas G is supplied from the storage tank 31 to the fuel heating part 33 through the fuel supply line 32. In the cooling step S10, heat exchange between the supplied liquefied natural gas G and the seawater A is performed, whereby the liquefied natural gas G is heated and vaporized and at the same time, the seawater A is cooled.

In the refrigerant supply step S80, the condenser refrigerant cooled in the cooling part 80 is sent to the condenser 6. In the refrigerant supply step S80 of this embodiment, the seawater A cooled in the fuel heating part is pressure-fed to the condenser 6 through the refrigerant supply line main body 811 by the condenser refrigerant booster pump 813.

In the steam cooling step S90, the steam Sb is cooled and condensed in the condenser 6 by the cooled condenser refrigerant. In the steam cooling step S90 of this embodiment, heat exchange between the seawater A supplied to the condenser 6 through the refrigerant supply line main body 811 and the steam Sb which has been sent from the steam turbine 5 is performed. In this way, in the steam cooling step S90, the steam Sb is returned to the water W and at the same time, the seawater A is heated. In the steam cooling step S90, the heated seawater A is discharged from the condenser 6 and discharged to the sea through the refrigerant supply line main body 811.

According to the cooling equipment 8 or the cooling method S100 as described above, in the cooling step S10, the seawater A can be cooled by using heat when vaporizing the liquefied natural gas G in the fuel heating part 33 that is the cooling part 80. By sending the cooled seawater A to the condenser 6 through the refrigerant supply line 81, it is possible to cool the steam Sb used for the driving of the steam turbine 5 by using the liquefied natural gas G. Therefore, the degree of vacuum of the condenser 6 is improved by cooling the steam Sb by using the seawater A cooled by the liquefied natural gas G, and thus it is possible to generate a pressure difference between the inlet side and the outlet side of the steam turbine 5. As a result, it is possible to increase the amount of work of the steam turbine. In this way, the cold energy of the liquefied natural gas G is recovered as energy for cooling the steam Sb and can be effectively used as energy for cooling the steam Sb which has driven the steam turbine 5. As a result, it is possible to improve the output of the steam turbine 5.

In the cooling equipment 8 or the cooling method S100, the steam Sb which has driven the steam turbine 5 is cooled in the condenser 6 by using the seawater A which is cooled in the cooling part 80 and then provided as the condenser refrigerant, and is then returned to the sea again. In this way, the temperature of seawater which is returned to the sea can be suppressed, as compared to a case where there is no cooling part 80. For this reason, it is possible to supply the condenser refrigerant to the condenser 6 while suppressing an environmental load.

For example, in a case where intake air of not only the steam turbine 5 but also the gas turbine 2 is cooled, the intake air amount (the mass flow rate) of the gas turbine 2 increases. For this reason, as long as an attempt to maintain a combustion temperature at the same temperature is made, the amount of consumption of fuel which is used increases, and thus the heat quantity of the flue gas of the turbine 23 also increases. The heat quantity of the flue gas increases, whereby the holding heat quantity (basically, the amount of evaporation) of the steam Sa which is generated in the heat recovery steam generator 4 by using the flue gas also increases. For this reason, the temperature of the seawater A which has been used in the condenser 6 in order to cool the steam Sb which has driven the steam turbine 5 also rises. As a result, the temperature of the seawater A which is discharged to the sea also rises, and thus an environmental load further increases.

According to the combined cycle plant 1 as described above, it is possible to improve the output of the steam turbine 5 without increasing the amount of consumption of the fuel which is used in the gas turbine 2. As a result, it is possible to improve the thermal efficiency of the combined cycle plant 1 as a whole.

In a case of increasing the output of the gas turbine 2 by cooling the intake air of the gas turbine 2, the amount of consumption of the fuel which is used in the gas turbine 2 also increases. For this reason, even if the output of the gas turbine 2 is increased, improvement in the thermal efficiency of the combined cycle plant 1 is unlikely to be expected.

On the other hand, in improving the output of the steam turbine 5, rather than the gas turbine 2, by improving the degree of vacuum of the condenser by lowering the temperature of the condenser refrigerant, it is not necessary to change the amount of consumption of the fuel which is used in the gas turbine 2. In this way, it is possible to improve the thermal efficiency of the combined cycle plant 1 as a whole.

Second Embodiment

Figure 3:
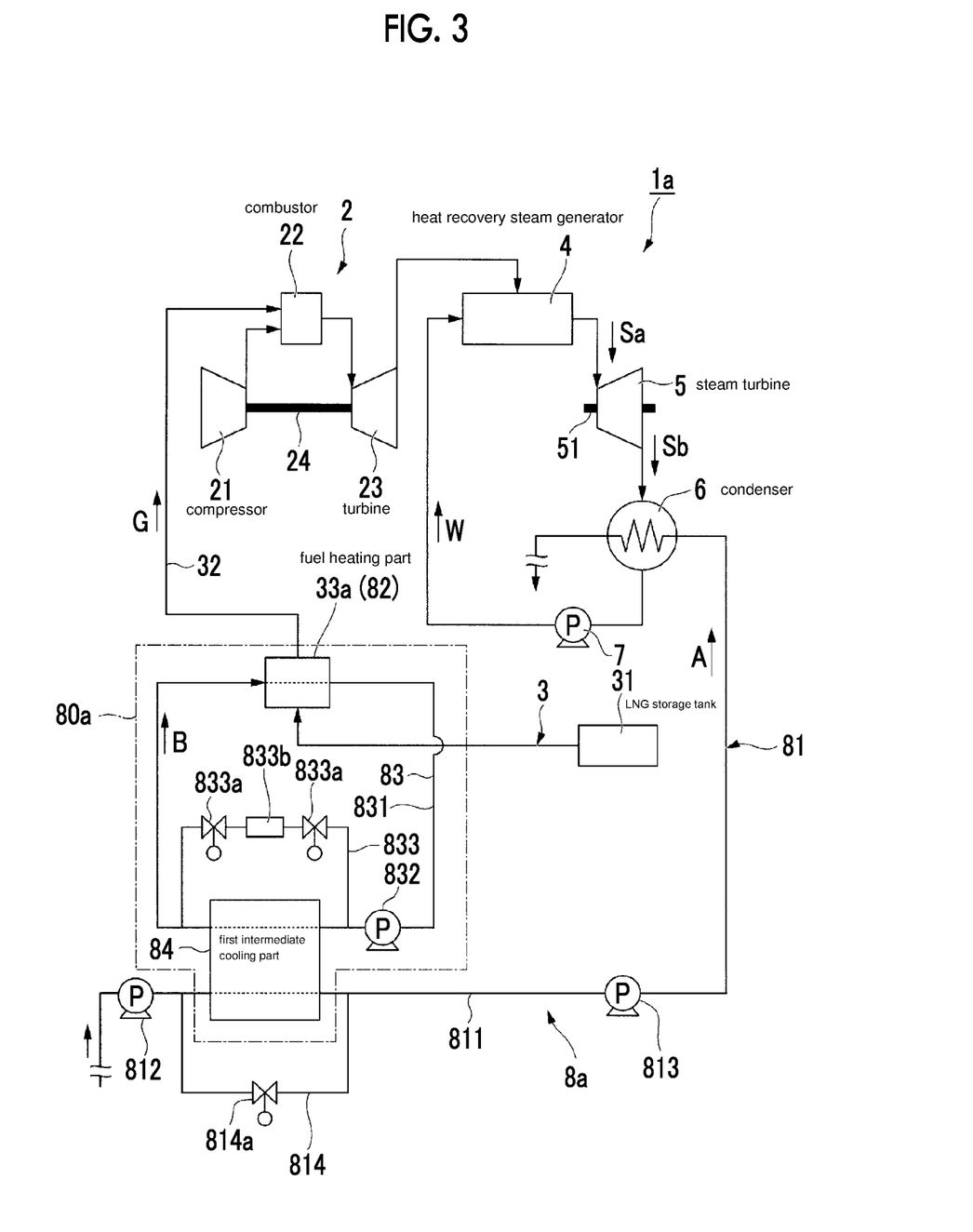
FIG. 3 is a system diagram showing a combined cycle plant in a second embodiment of the present invention.

Next, a combined cycle plant 1*a* of a second embodiment will be described with reference to FIGS. 3 and 4.

In the second embodiment, the same constituent elements as those in the first embodiment are denoted by the same reference numerals and detailed description thereof is omitted. The combined cycle plant 1*a* of the second embodiment is different in the configuration of a cooling part 80*a* of cooling equipment 8*a* from the combined cycle plant 1 of the first embodiment.

The cooling part 80*a* of the second embodiment indirectly cools the seawater A that is the condenser refrigerant by using a first intermediate refrigerant B, without directly cooling the seawater A by the liquefied natural gas G. Specifically, the cooling part 80*a* of the second embodiment has a liquefied gas heat exchange part 82, a first intermediate refrigerant circulation line 83, and a first intermediate cooling part 84, as shown in FIG. 3. The liquefied gas heat exchange part 82 cools the first intermediate refrigerant B by heat exchange with the liquefied natural gas G. The first intermediate refrigerant circulation line 83 is connected to the liquefied gas heat exchange part 82, and the cooled first intermediate refrigerant B circulates through the first intermediate refrigerant circulation line 83. The first intermediate cooling part 84 is provided on the first intermediate refrigerant circulation line 83 and cools the seawater A by using the cooled first intermediate refrigerant B which circulates.

The liquefied gas heat exchange part 82 is the fuel heating part 33 used as the cooling part 80 in the first embodiment. That is, a fuel heating part 33*a* of the second embodiment is disposed across the fuel supply line 32 and the first intermediate refrigerant circulation line 83. The liquefied gas heat exchange part 82 performs heat exchange between the liquefied natural gas G and the first intermediate refrigerant B when vaporizing the liquefied natural gas G. In this way, the liquefied gas heat exchange part 82 heats the liquefied natural gas G and at the same time, cools the first intermediate refrigerant B. As the first intermediate refrigerant B of this embodiment, ethylene glycol or the like, that is an anti-freezing solution, is used.

The first intermediate refrigerant circulation line sends the first intermediate refrigerant B cooled in the fuel heating part 33*a* that is the liquefied gas heat exchange part 82 to the first intermediate cooling part 84, and sends the first intermediate refrigerant B discharged from the first intermediate cooling part 84, to the fuel heating part 33*a* again. That is, the first intermediate refrigerant circulation line 83 connects the fuel heating part 33*a* and the first intermediate cooling part 84 to each other and makes the first intermediate refrigerant B circulate therethrough.

The first intermediate refrigerant circulation line 83 of this embodiment has a first intermediate refrigerant circulation line main body 831, a first intermediate booster pump 832, and a first intermediate bypass line 833. The first intermediate refrigerant circulation line main body 831 is a pipe. The first intermediate booster pump 832 pressure-feeds the cooled first intermediate refrigerant B toward the first intermediate cooling part 84. The first intermediate bypass line 833 is connected to the first intermediate refrigerant circulation line main body 831 by bypassing the first intermediate cooling part 84 so as not to pass through the first intermediate cooling part 84. The first intermediate bypass line 833 is provided with first intermediate bypass valves 833*a* which adjust the flow rate of the first intermediate refrigerant B which flows therethrough, and an air heater 833*b* which heats the first intermediate refrigerant B by using air.

The first intermediate cooling part 84 is provided in the middle of the first intermediate refrigerant circulation line main body 831 so as to straddle the first intermediate refrigerant circulation line 83 and the refrigerant supply line 81. The first intermediate cooling part 84 cools the taken-in seawater A by using the first intermediate refrigerant B cooled in the liquefied gas heat exchange part 82. The first intermediate cooling part 84 of this embodiment is a heat exchanger which performs heat exchange between the first intermediate refrigerant B and the seawater A. The first intermediate cooling part 84 performs heat exchange between the first intermediate refrigerant B and the seawater A, thereby heating the first intermediate refrigerant B and at the same time, cooling the seawater A.

The supply bypass line 814 of the second embodiment is connected to the refrigerant supply line main body 811 by bypassing the first intermediate cooling part 84 so as not to pass through the first intermediate cooling part 84.

Next, a cooling method S101 of the second embodiment will be described.

Figure 4:
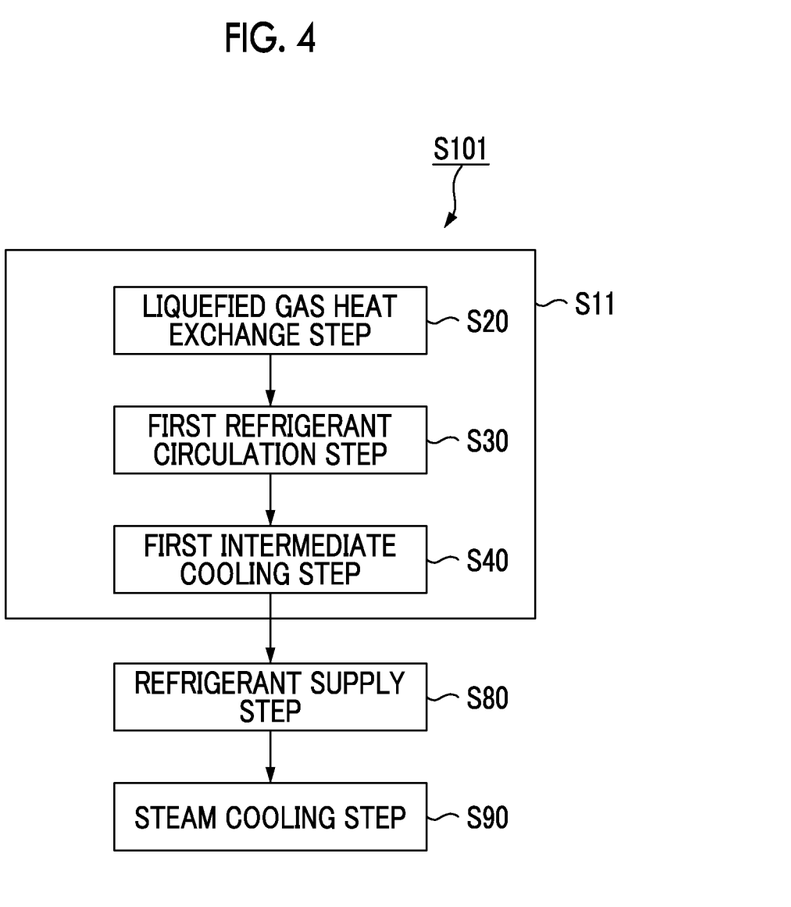
FIG. 4 is a flow diagram describing a cooling method in the second embodiment of the present invention.

In the cooling method S101 of the second embodiment, as shown in FIG. 4, a cooling step S11 is different from the cooling step S10 of the first embodiment. In the cooling step S11 of the second embodiment, the condenser refrigerant is cooled by indirectly using the low-temperature liquefied natural gas G.

Specifically, the cooling step S11 of the second embodiment has a liquefied gas heat exchange step S20, a first intermediate refrigerant circulation step S30, and a first intermediate cooling step S40. In the liquefied gas heat exchange step S20, the first intermediate refrigerant B is cooled by heat exchange with the liquefied natural gas G. In the first intermediate refrigerant circulation step S30, the first intermediate refrigerant B cooled in the liquefied gas heat exchange step S20 is made to circulate. In the first intermediate cooling step S40, the seawater A is cooled by using the first intermediate refrigerant B which circulates.

In the liquefied gas heat exchange step S20, the first intermediate refrigerant B is cooled by performing heat exchange between the liquefied natural gas G and the first intermediate refrigerant B by using the fuel heating part 33*a* that is the liquefied gas heat exchange part 82. Specifically, in the liquefied gas heat exchange step S20, the first intermediate refrigerant B circulating through the first intermediate refrigerant circulation line 83 is supplied to the fuel heating part 33*a*.

In the liquefied gas heat exchange step S20, the liquefied natural gas G is supplied from the storage tank 31 to the fuel heating part 33a through the fuel supply line 32. In the liquefied gas heat exchange step S20, heat exchange between the first intermediate refrigerant B supplied to the fuel heating part 33a and the liquefied natural gas G is performed. In this way, in the liquefied gas heat exchange step S20, the liquefied natural gas G is heated and vaporized and at the same time, the first intermediate refrigerant B is cooled.

In the first intermediate refrigerant circulation step S30, the first intermediate refrigerant B cooled in the liquefied gas heat exchange part 82 is sent to the first intermediate cooling part 84. In the first intermediate refrigerant circulation step S30 of this embodiment, the first intermediate refrigerant B cooled in the fuel heating part 33a is pressure-fed to the first intermediate cooling part 84 through the first intermediate refrigerant circulation line main body 831 by the first intermediate booster pump 832.

In the first intermediate cooling step S40, the seawater A is cooled by performing heat exchange between the first intermediate refrigerant B and the seawater A by using the first intermediate cooling part 84 that is a heat exchanger. Specifically, in the first intermediate cooling step S40, heat exchange between the first intermediate refrigerant B sent to the first intermediate cooling part 84 and the seawater A taken in from the sea and supplied to the first intermediate cooling part 84 through the refrigerant supply line main body 811 is performed. In this way, in the first intermediate cooling step S40, the first intermediate refrigerant B is heated and at the same time, the seawater A is cooled.

Similarly to the first embodiment, the refrigerant supply step S80 and the steam cooling step S90 are carried out, whereby the cooled seawater A is used in order to cool the steam Sb in the condenser 6.

According to the cooling equipment 8a and the cooling method S101 as described above, in the liquefied gas heat exchange step S20, the first intermediate refrigerant B is cooled in the liquefied gas heat exchange part 82 by using the liquefied natural gas G. Thereafter, in the first intermediate cooling step S40, the seawater A is cooled in the first intermediate cooling part 84 by using the cooled first intermediate refrigerant B. In this way, the seawater A can be indirectly cooled by using the liquefied natural gas G. For this reason, it is possible to reduce a temperature difference between the liquefied natural gas G and the first intermediate refrigerant B, and a temperature difference between the first intermediate refrigerant B and the seawater A.

Therefore, even if the liquefied natural gas G has a low temperature such as −160° C., it is possible to provide means for cooling the seawater A while preventing the seawater A from freezing. A temperature difference between two fluids flowing through each heat exchange part is reduced, whereby it is possible to reduce a thermal load on the fuel heating part 33a or the first intermediate cooling part 84. In this way, cold energy which is generated when vaporizing the liquefied natural gas G can be recovered and can be effectively used as energy for cooling the steam Sb.

Third Embodiment

Figure 5:
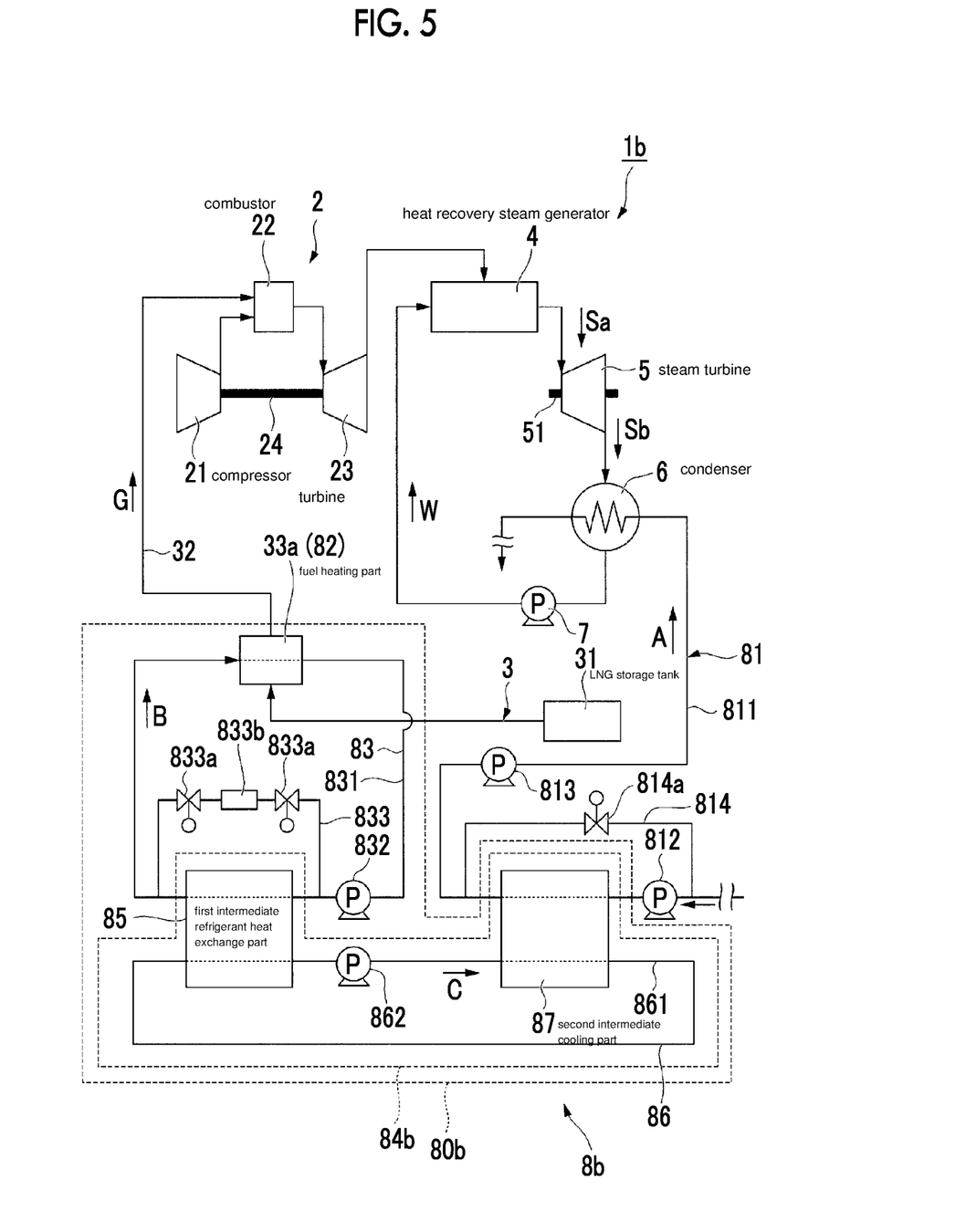
FIG. 5 is a system diagram showing a combined cycle plant in a third embodiment of the present invention.

Next, a combined cycle plant 1b of a third embodiment will be described with reference to FIGS. 5 and 6.

In the third embodiment, the same constituent elements as those in the first embodiment or the second embodiment are denoted by the same reference numerals and detailed description thereof is omitted. The combined cycle plant 1b of the third embodiment is different in the configuration of a first intermediate cooling part 84b of a cooling part 80b from the combined cycle plant 1a of the second embodiment.

The first intermediate cooling part 84b of the third embodiment further indirectly cools the seawater A that is the condenser refrigerant by using a second intermediate refrigerant C without directly cooling the seawater A by using the first intermediate refrigerant B. Specifically, the first intermediate cooling part 84b of the third embodiment has a first intermediate refrigerant heat exchange part 85, a second intermediate refrigerant circulation line 86, and a second intermediate cooling part 87, as shown in FIG. 5. The first intermediate refrigerant heat exchange part 85 cools the second intermediate refrigerant C by heat exchange with the cooled first intermediate refrigerant B. In the second intermediate refrigerant circulation line 86, the cooled second intermediate refrigerant C circulates. The second intermediate cooling part 87 cools the seawater A by using the second intermediate refrigerant C which circulates.

The first intermediate refrigerant heat exchange part 85 is provided in the middle of the first intermediate refrigerant circulation line main body 831. The first intermediate refrigerant heat exchange part 85 cools the second intermediate refrigerant C by using the first intermediate refrigerant B cooled in the liquefied gas heat exchange part 82. The first intermediate refrigerant heat exchange part 85 of this embodiment is a heat exchanger which performs heat exchange between the first intermediate refrigerant B and the second intermediate refrigerant C.

The first intermediate refrigerant heat exchange part 85 of this embodiment is disposed across the first intermediate refrigerant circulation line 83 and the second intermediate refrigerant circulation line 86. The first intermediate refrigerant heat exchange part 85 performs heat exchange between the first intermediate refrigerant B and the second intermediate refrigerant C. In this way, the first intermediate refrigerant heat exchange part 85 heats the first intermediate refrigerant B and at the same time, cools the second intermediate refrigerant C. As the second intermediate refrigerant C of this embodiment, circulating water is used.

The second intermediate refrigerant circulation line 86 sends the second intermediate refrigerant C cooled in the first intermediate refrigerant heat exchange part 85 to the second intermediate cooling part 87 and sends the second intermediate refrigerant C discharged from the second intermediate cooling part 87, to the first intermediate refrigerant heat exchange part 85 again. That is, the second intermediate refrigerant circulation line 86 connects the first intermediate refrigerant heat exchange part 85 and the second intermediate cooling part to each other and circulates the second intermediate refrigerant C therethrough.

The second intermediate refrigerant circulation line of this embodiment has a second intermediate refrigerant circulation line main body 861 that is a pipe, and a second intermediate booster pump 862 which pressure-feeds the cooled second intermediate refrigerant C toward the second intermediate cooling part 87.

The second intermediate cooling part 87 is provided in the middle of the second intermediate refrigerant circulation line main body 861 so as to straddle the second intermediate refrigerant circulation line main body 861 and the refrigerant supply line main body 811. The second intermediate cooling part 87 cools the taken-in seawater A by using the second intermediate refrigerant C cooled in the first intermediate refrigerant heat exchange part 85. The second intermediate cooling part 87 of this embodiment is a heat exchanger which performs heat exchange between the second intermediate refrigerant C and the seawater A. The second intermediate cooling part 87 performs heat exchange between the second intermediate refrigerant C and the seawater A, thereby heating the second intermediate refrigerant C and at the same time cooling the seawater A.

Next, a cooling method S102 of the third embodiment will be described.

Figure 6:
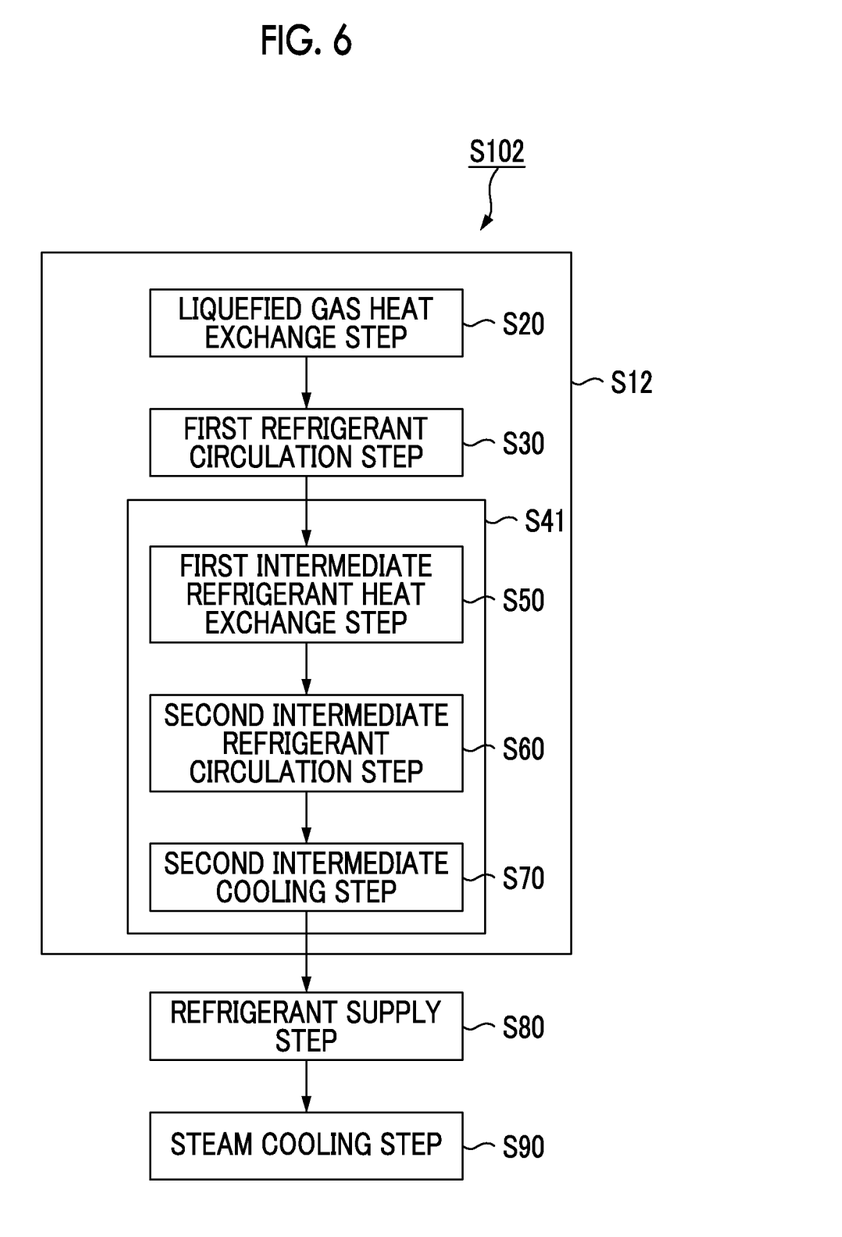
FIG. 6 is a flow diagram describing a cooling method in the third embodiment of the present invention.

In the cooling method S102 of the third embodiment, as shown in FIG. 6, a first intermediate cooling step S41 of a cooling step S12 is different from the first intermediate cooling step S40 of the second embodiment. The first intermediate cooling step S41 of the third embodiment cools the condenser refrigerant by indirectly using the low-temperature first intermediate refrigerant B cooled by the liquefied natural gas G.

Specifically, the first intermediate cooling step S41 of the third embodiment has a first intermediate refrigerant heat exchange step S50, a second intermediate refrigerant circulation step S60, and a second intermediate cooling step S70. In the first intermediate refrigerant heat exchange step S50, the second intermediate refrigerant C is cooled by heat exchange with the cooled first intermediate refrigerant B. In the second intermediate refrigerant circulation step S60, the cooled second intermediate refrigerant C is made to circulate. In the second intermediate cooling step S70, the seawater A is cooled by using the second intermediate refrigerant C which circulates.

In the first intermediate refrigerant heat exchange step S50, the second intermediate refrigerant C is cooled by performing heat exchange between the first intermediate refrigerant B and the second intermediate refrigerant C by using the first intermediate refrigerant heat exchange part 85 that is a heat exchanger. Specifically, in the first intermediate refrigerant heat exchange step S50, heat exchange between the first intermediate refrigerant B supplied from the first intermediate refrigerant circulation line main body 831 to the first intermediate refrigerant heat exchange part 85 and the second intermediate refrigerant C supplied to the first intermediate refrigerant heat exchange part 85 through the second intermediate refrigerant circulation line main body 861 is performed. In this way, in the first intermediate refrigerant heat exchange step S50, the first intermediate refrigerant B is heated and at the same time, the second intermediate refrigerant C is cooled.

In the second intermediate refrigerant circulation step S60, the second intermediate refrigerant C cooled in the first intermediate refrigerant heat exchange part 85 is sent to the second intermediate cooling part 87. In the second intermediate refrigerant circulation step S60 of this embodiment, the second intermediate refrigerant C cooled in the first intermediate refrigerant heat exchange part 85 is pressure-fed to the second intermediate cooling part 87 through the second intermediate refrigerant circulation line main body 861 by the second intermediate booster pump 862.

In the second intermediate cooling step S70, the seawater A is cooled by performing heat exchange between the second intermediate refrigerant C and the seawater A by using the second intermediate cooling part 87 that is a heat exchanger. Specifically, in the second intermediate cooling step S70, heat exchange between the second intermediate refrigerant C supplied from the second intermediate refrigerant circulation line main body 861 to the second intermediate cooling part 87 and the seawater A taken in from the sea and supplied to the second intermediate cooling part 87 through the refrigerant supply line main body 811 is performed. In this way, in the second intermediate cooling step S70, the second intermediate refrigerant C is heated and at the same time, the seawater A is cooled.

Similarly to the first embodiment or the second embodiment, the refrigerant supply step S80 and the steam cooling step S90 are carried out, whereby the cooled seawater A is used in order to cool the steam Sb in the condenser 6.

According to the cooling equipment 8*b* and the cooling method S102 as described above, in the first intermediate refrigerant heat exchange step S50, the second intermediate refrigerant C is cooled in the first intermediate refrigerant heat exchange part 85 by using the first intermediate refrigerant B cooled by the liquefied natural gas G. Thereafter, in the second intermediate cooling step S70, the seawater A is cooled in the second intermediate cooling part 87 by the cooled second intermediate refrigerant C. That is, indirect cooling can be performed through two stages of refrigerants until the seawater A is cooled by using the liquefied natural gas G. In this manner, due to a configuration composed of a plurality of intermediate refrigerant cycles having different operating temperature zones, it is possible to further reduce a temperature difference between two fluids flowing through each heat exchange part. In this way, it is possible to reduce a thermal load per heat exchange part, and thus it is possible to use a heat exchange part having a compact configuration as each heat exchange part. Due to a configuration composed of a plurality of intermediate refrigerant cycles having different operating temperature zones, diversion to a plant cycle such as a cycle of shaft cooling water for a plant auxiliary machine (or cooling thereof), for example, is also possible. Therefore, it is possible to provide means for cooling the seawater A while preventing the seawater A from freezing, even if the liquefied natural gas G has a low temperature such as about −160° C., and while flexibly coping with the existing facility configuration.

It is possible to reduce a temperature difference between two fluids flowing through each heat exchange part. That is, it is possible to reduce a thermal load on the fuel heating part 33*a*, the first intermediate refrigerant heat exchange part 85, or the second intermediate cooling part 87. In this way, cold energy which is generated when vaporizing the liquefied natural gas G can be recovered and can be effectively used as energy for cooling the steam Sb.

The embodiments of the present invention have been described above in detail with reference to the drawings. However, the respective configurations in the embodiments, a combination thereof, and the like are examples, and addition, omission, substitution, and other changes of the configurations can be made within a scope which does not depart from the gist of the present invention. Further, the present invention is not limited by the embodiments, but is limited only by the scope of the appended claims.

The condenser refrigerant in the present invention is not limited to the seawater A as in the embodiments, and it is acceptable if it is a refrigerant capable of cooling the steam Sb in the condenser 6. For example, the condenser refrigerant may be circulating water which is supplied from a cooling tower, or may be river water taken in from rivers or the like.

The first intermediate refrigerant B or the second intermediate refrigerant C is not limited to that of the embodiments, and it is acceptable if it can be used as a refrigerant. For example, the second intermediate refrigerant C may be glycol which is used as the first intermediate refrigerant B in the embodiments.

The liquefied gas heat exchange part 82 is not limited to the fuel heating part 33 or 33*a* as in the embodiments, and it is acceptable if it is a heat exchanger capable of performing heat exchange between the first intermediate refrigerant B and the liquefied natural gas G.

INDUSTRIAL APPLICABILITY

According to the cooling equipment and the cooling method described above, by cooling the condenser refrigerant by using the liquefied gas, it is possible to improve the output of the steam turbine without increasing the fuel consumption of the gas turbine.

REFERENCE SIGNS LIST 1, 1a, 1b: combined cycle plant
2: gas turbine
21: compressor
22: combustor
23: turbine
24: gas turbine rotor
G: liquefied natural gas
3: fuel supply part
31: storage tank
32: fuel supply line
33, 33a: fuel heating part
4: heat recovery steam generator
S: steam
5: steam turbine
51: steam turbine rotor
6: condenser
W: water
7: feed-water pump
8: cooling equipment
81: refrigerant supply line
811: refrigerant supply line main body
812: water intake pump
813: condenser refrigerant booster pump
814: supply bypass line
814a: supply bypass valve
A: seawater
80, 80a, 80b: cooling part
S100, S101, S102: cooling method
S10, S11, S12: cooling step
S80: refrigerant supply step
S90: steam cooling step
82: liquefied gas heat exchange part
B: first intermediate refrigerant
83: first intermediate refrigerant circulation line
831: first intermediate refrigerant circulation line main body
832: first intermediate booster pump
833: first intermediate bypass line
833a: first intermediate bypass valve
833b: air heater
84, 84b: first intermediate cooling part
S20: liquefied gas heat exchange step
S30: first intermediate refrigerant circulation step
S40, S41: first intermediate cooling step
C: second intermediate refrigerant
85: first intermediate refrigerant heat exchange part
86: second intermediate refrigerant circulation line
861: second intermediate refrigerant circulation line main body
862: second intermediate booster pump
87: second intermediate cooling part
S50: first intermediate refrigerant heat exchange step
S60: second intermediate refrigerant circulation step
S70: second intermediate cooling step

The invention claimed is:

1. Cooling equipment comprising:
a refrigerant supply line configured to supply condenser refrigerant to a condenser, the condenser refrigerant cooling steam that has driven a steam turbine, thereby returning the steam to water; and
a cooling part provided on the refrigerant supply line and operable to perform heat exchange between liquefied gas, which is used as fuel for a gas turbine, and the condenser refrigerant, thereby heating and vaporizing the liquefied gas and cooling the condenser refrigerant,
wherein seawater is used as the condenser refrigerant, and the seawater is discharged to sea after the seawater has cooled the steam,
wherein the refrigerant supply line includes:
a refrigerant supply line main body provided with the cooling part in the middle thereof, the refrigerant supply line main body having an inlet through which the seawater is supplied to the cooling part and an outlet through which the seawater is discharged to the sea, and
a supply bypass line connected to the refrigerant supply line main body by bypassing the cooling part, the supply bypass line being provided with a supply bypass valve for adjusting a flow rate of the seawater,
wherein a first end of the supply bypass line is connected to the refrigerant supply main body between the cooling part and the inlet of the refrigerant supply line main body, and a second end of the supply bypass line is connected to the refrigerant supply main body between the cooling part and the condenser, such that an upstream side of the cooling part and a downstream side of the cooling part are connected by the supply bypass line.

2. A combined cycle plant comprising:
the cooling equipment of the gas turbine, according to claim 1;
the gas turbine;
a heat recovery steam generator which generates steam by flue gas which is discharged from the gas turbine;
the steam turbine which is driven by the steam generated in the heat recovery steam generator; and
the condenser.

3. A cooling method comprising:
supplying a condenser refrigerant to a condenser via a refrigerant supply line main body, the condenser refrigerant cooling steam that has driven a steam turbine, thereby returning the steam to water; and
before the supplying of the condenser refrigerant, cooling the condenser refrigerant by performing heat exchange between liquefied gas, which is used as fuel for a gas turbine, and the condenser refrigerant, thereby heating and vaporizing the liquefied gas and cooling the condenser refrigerant,
wherein in the cooling of the condenser refrigerant, seawater is used as the condenser refrigerant, and the seawater is discharged to sea after the seawater has cooled the steam,
wherein the supplying of the condenser refrigerant further includes the seawater bypassing a cooling part that is configured to perform heat exchange between the liquefied gas and the seawater,
wherein the refrigerant supply line main body has an inlet through which the seawater is supplied to the cooling part and an outlet through which the seawater is discharged to the sea, and wherein the bypassing of the cooling part includes adjusting a flow rate of the seawater that is supplied to the condenser by a supply bypass line in which a first end of the supply bypass line is connected to the refrigerant supply line main body between the cooling part and the inlet of the refrigerant supply line main body, and a second end of the supply bypass line is connected to the refrigerant supply line main body between the cooling part and the condenser.

* * * * *